June 3, 1952 R. E. SANTO 2,599,351
METER FOR DETERMINING THE AMPLITUDES
OF SINE WAVES RECORDED ON DISKS
Filed Nov. 20, 1948 3 Sheets-Sheet 1

INVENTOR
ROBERT E. SANTO
BY
Louis H. Carreau
ATTORNEY

June 3, 1952

R. E. SANTO 2,599,351

METER FOR DETERMINING THE AMPLITUDES
OF SINE WAVES RECORDED ON DISKS

Filed Nov. 20, 1948

INVENTOR
ROBERT E. SANTO
BY
Louis H. Caneau
ATTORNEY

Patented June 3, 1952

2,599,351

UNITED STATES PATENT OFFICE 2,599,351

METER FOR DETERMINING THE AMPLI-
TUDES OF SINE WAVES RECORDED ON
DISKS

Robert E. Santo, Montreal, Quebec, Canada

Application November 20, 1948, Serial No. 61,193

3 Claims. (Cl. 88—14)

This invention relates to a meter for determining the amplitudes of sine waves recorded on discs.

More particularly, the invention is concerned with an instrument for measuring the frequency response of recording amplifiers and recording heads.

As is known, the voltage obtainable from a recording for any given frequency is proportional to the maximum radial velocity of the pick-up needle at that particular frequency.

For many years, a system known as the Buchmann-Meyer, an optical system, has been used for measuring the maximum radial velocity of sine waves recorded on discs. As this system demonstrates, the maximum radial velocity is equal to a constant times the product of the radius to the groove under consideration and the pattern width reflected from that particular groove.

A brief reference to this system should be made at this time, better to explain the operation of the meter of the present invention.

If a beam of light with parallel rays is made to fall on modulated grooves on a recording disc, a band of light will be seen, the width of which varies with the amount of modulation. If a series of tones of various frequencies are recorded on a disc, then the width of the band of light—called the light pattern—for each frequency represents the level actually put on the disc by the recording head at that frequency. A response curve of the recording head may thus be mathematically computed.

Figure 5 of the drawings illustrates the general principle of this system. This figure shows a sine wave recorded on a disc (not shown) at a radius R from the centre C of such disc. Parallel light rays S—S from a source emanating from a relatively great distance are reflected from the modulated groove. Between points O—O, these parallel rays will be reflected from some portion of the sine wave groove to E, representing the eye. The distance between the points O—O is the pattern width. No reflected rays reach the eye from outside these points since they occur at the position of maximum slope for the sine wave, this maximum slope being found where the sine wave crosses the zero axis and is represented by the line OP which bears an angle "b" to a line A—A drawn through the points O—O. The value of the angle "b" depends on the position of both the eye and the light source with respect to the groove under consideration, and when determined, corrects the apparent variations in the band width. The angle "b" cannot be neglected if measurements of absolute level on a disc are desired.

A meter made according to my invention embodies the Buchmann-Meyer system but eliminates the error or factor represented by angle "b" above referred to. The meter computes the maximum velocity and gives a reading thereof, conveniently in decibels. The result is at all times equal to a constant times the product of the radius to the groove under consideration, and the pattern width reflected from that particular groove. The lengths of the radius and that of the pattern width are converted to two electrical voltages which are multiplied together in an electric circuit and the result shown.

An object of the invention is to provide an instrument for measuring the amplitudes of sine waves recorded on discs, thus obviating the necessity of mathematical computation from light patterns.

Another object of the invention is to provide a small and compact meter for measuring the amplitudes of sine waves recorded on discs which is accurate, easy to operate, and can be used in a lighted room.

Another object of the invention is to provide an instrument by which the width of a light pattern reflected from a groove of a disc on which a sine wave of a certain frequency has been recorded will be an exact function of the maximum radial velocity of the pick-up needle for that frequency.

In the preferred form of the invention, the disc is supported on a turntable which is adapted to be moved bodily in a straight line in a plane, an eyepiece and a pointer are fixedly mounted above the table and define a line of sight the axis of which is at right angles to the plane of the table to pass through the line of bodily travel of the table, and a source of light (an electric lamp) is adapted to be moved in a straight line at right angles to the line of bodily travel of the table and parallelly with but spaced from the plane of such table. A potentiometer has its movable contact mechanically operatively connected to the light source so as to move therewith and proportionally thereto. The output of this potentiometer is fed to a vacuum tube connected as a cathode follower. The output of the cathode follower is developed across a second potentiometer in the cathode circuit. The movable arm of this second potentiometer is mechanically operatively connected to the turntable so as to move therewith and proportionally thereto. Thus, the output of this cathode follower circuit represents the product of two variables, one being a function of the width of the reflected light pattern, and the other being a function of the distance between the centre of the disc and the particular groove under consideration. This output is connected to a V. U. meter.

In the drawings, wherein like numerals of reference indicate corresponding parts in the various figures, Figure 1 is a top plan view of the meter, with the cover or panel partly broken away;

Figure 2:
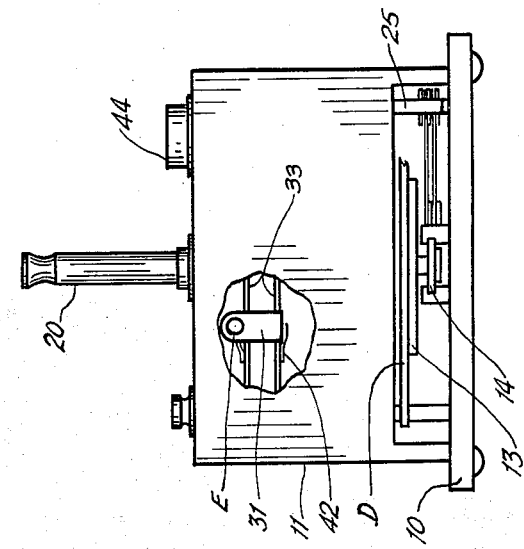
Figure 2 is a front view of Figure 1, with the cover partly broken away.
Figure 1:
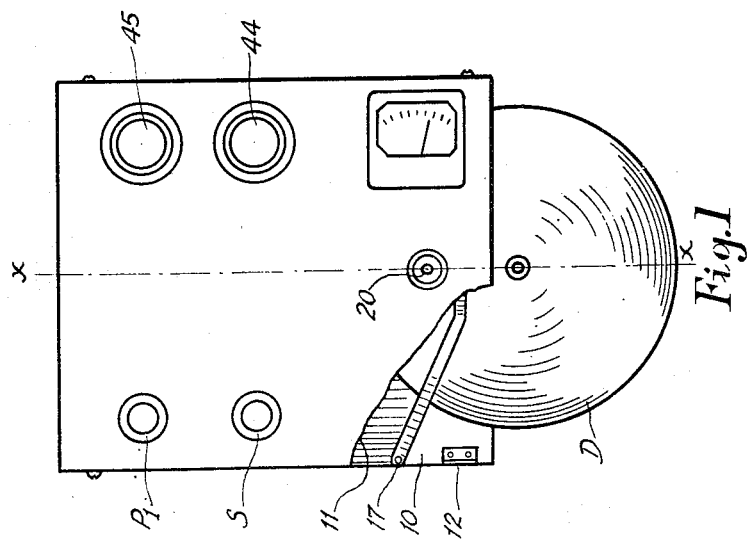
Figure 3:
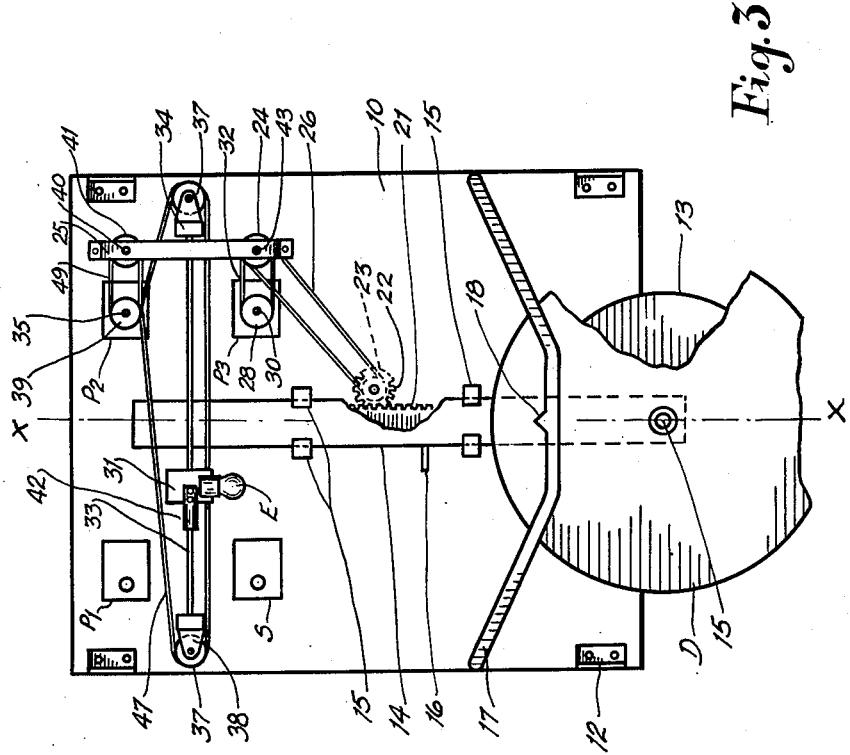
Figure 3 is also a top plan view of Figure 1, on an enlarged scale, but with the top cover removed.
Figure 4:
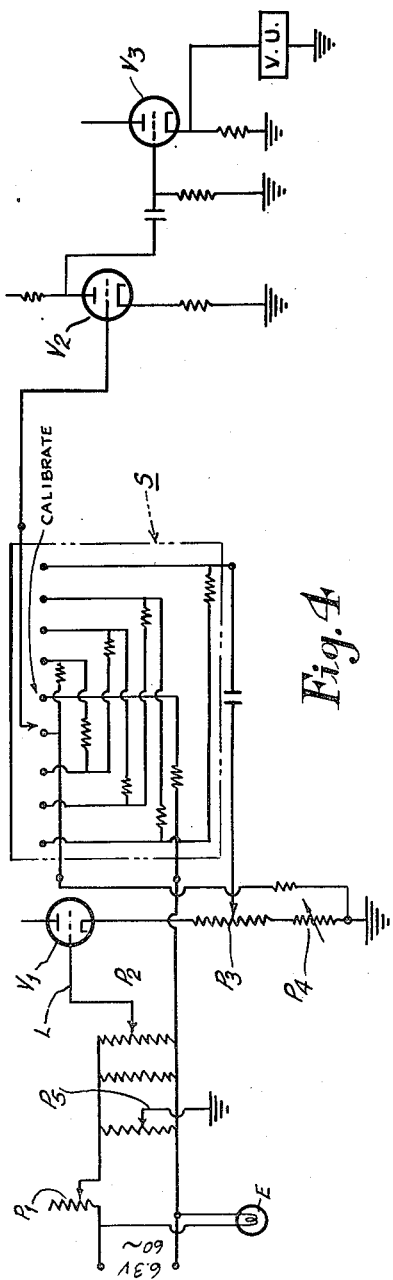
Figure 4 shows the electric circuit.
Figure 5:
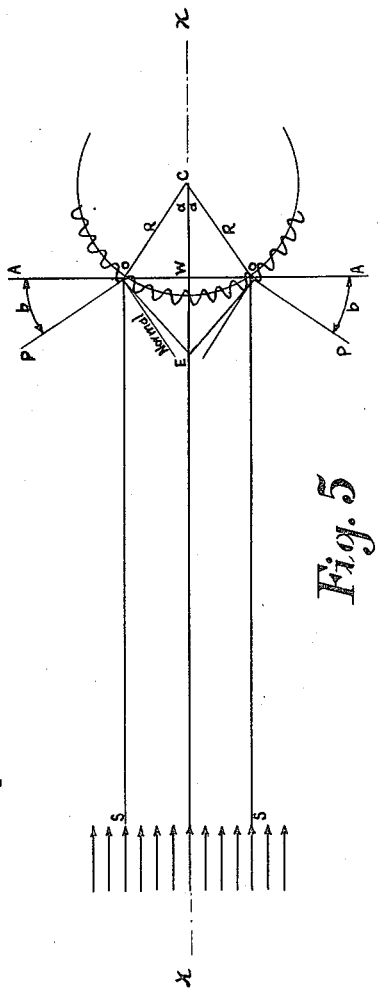
Figure 5 is a diagram used as a reference in the specification.

Referring now by numerals to the drawings, 10 is the base of the meter and 11, the cover or panel. The cover conveniently takes the shape of a hollow receptacle which is removably secured to the base as with screws (not shown) passed through the side walls of the cover to thread into lugs 12 secured to the base.

The disc D is laid upon a round table 13 rotatably supported by an elongated member 14, the disc being centered as by a circular post 15 rising from the centre of the table to project through the centre hole of the disc. The table support or member 14 is supported in slide bearings 15 rising from the base 10 to permit of the bodily movement of the table in an axis X—X. The movement of the table, longitudinally in the axis X—X, is determined by the engagement of a pin 16 carried by the member 14 with one or the other of the bearings 15. Moving with the member 15 is a rack 21 meshing with a gear 22 rotatably mounted above the base. Turning with the gear is a pulley 23.

Rising from the base is a U-shaped member 17 which carries a pointer 18 which is disposed vertically above the axis X—X.

Secured to the cover 11 is an eyepiece 20, the eyepiece being so disposed that its longitudinal axis or line of sight is at right angles to the plane of the table and passes through the effective end of the pointer.

Rotatably mounted above the base is a double pulley 24 fixed on a spindle 43 journalled in the base and a strap 25. The pulley 23 is operatively connected to the pulley 24 to be driven thereby, as by a wire 26 tensioned between the pulleys to act as an endless belt. The pulley 24 is in turn similarly operatively connected to a pulley 28 fixed to a spindle 30 to which is fixed the movable contact of a potentiometer P3, a wire 32 being tensioned between the pulleys 28 and 24. As the potentiometer is operated or adjusted, as by turning the spindle 28, the table is moved bodily in the axis X—X. In other words, the bodily movement of the table 13 in the axis X—X is proportional to the movement of the contact arm of the potentiometer, that is, proportional to its output.

E is an electric lamp suitably carried by a block 31 of insulating material slidably supported by two superposed metal rods 33 anchored at their opposite ends in brackets 34 of insulating material rising from the base. The rods are disposed above the table so that the lamp is movable parallelly with the table and at right angles to the axis X—X.

The lamp is provided with contacts 42 sliding on the metal rods or tracks 33 which are electrically connected to a source of electric power. The lamp is mechanically connected to a spindle 35 mounting the movable contact of a second potentiometer P2 so as to be moved proportionally to the movement of the contact, that is, proportionally to the output of the potentiometer. Thus, as shown, 37 are pulleys journalled in bearings 38 secured to the brackets 34. 39 is a double pulley fixed to the spindle 35. A wire 47 is looped around the pulley 39 and is anchored at its opposite ends to the lamp block 31, the wire turning on and being tensioned against the pulleys 37. The pulley 39 is operatively connected to a pulley 41 fixed to a spindle 40 journalled between the base and the strap 25, as by a wire 49 tensioned between the pulleys and providing an endless belt. The spindles 40 and 43 extend through the cover 11, and to the upper ends of these spindles are secured operating knobs 45 and 44, respectively.

In practice, the distance between the lamp and the pointer is a minimum of approximately 15 inches, being a close approximation to light coming from infinity, that is, to a beam of light with parallel rays. With the light source at this distance, the accuracy of the instrument will be within 0.5 decibel.

An A. C. voltage of 6.3 volts is fed to the potentiometer P2 and the output of the latter is fed to the cathode follower V1 as by line L. Zero voltage is intended to be obtained at the centre of the pot movement when the pointer is directly above the centre of the light pattern. This potentiometer should be of such value—say, 100,000 ohms—that small increments of voltage may be measured as the pointer moves from wire to wire. Exact tracking is obtained by using a screw driver controlled potentiometer P5 tapped to the ground.

In one of the lines of the power circuit is preferably used an adjustable resistor P1 to take care of fluctuations or variations in the line voltage. As the movement of the potentiometer P2 is proportional to that of the lamp, as already stated, the output fed to the cathode follower V1 is proportional to the linear movement of the lamp away from its zero position above the centre of the light pattern.

The cathode resistor of the tube V1 is the potentiometer P3, the output of which is fed to a second vacuum tube V2 connected as an amplifier, via a range switch S. The output from the amplifier is fed to a cathode follower tube V3. As already stated, the potentiometer P3 is mechanically connected to the disc supporting member 14 so that the output from this potentiometer is proportional to the radius R, that is, the distance between the pointer and the centre of the table (or disc). Tracking of the potentiometer P3 with respect to R is obtained by an adjustable resistor P4 in the cathode circuit of the tube V1, that is to say, to correct any deviation from linearity between potentiometer P3 and R when R is small.

The range meter switch S is designed for discs turning at the usual standard velocities of 33⅓ and 78.26 R. P. M., and for various levels. The A. C. meter preferably is a V. U. meter and is calibrated in decibels.

*Operation*

The disc is laid upon the table and the radius control or potentiometer P3 is adjusted until the selected track or groove is seen directly under the tip of the pointer. The switch S is set at the "calibrate" position and the calibrating control P5 adjusted until the meter reads zero V. U. Calibration will vary with the line voltage and therefore requires to be checked occasionally. The light control potentiometer P2 is next operated until one edge of the light pattern is directly under the pointer. The meter switch is now turned to the appropriate range and the velocity is read in decibels relative to a zero level which corresponds to a stylus velocity of 5 cm. per second. Reading is now taken.

If desired, the lamp may be moved to bring the opposite edge of the light pattern under the pointer and a reading taken. Any difference in the two readings will indicate either that the control P5 was not properly adjusted or that there is distortion in the recorded wave shape.

While the purpose of the table is to support and move the disc bodily in a same plane, a turntable is used in the present instrument. By thus revolving the table, as by hand, it is possible to line up several waves or successive grooves within the scope of vision of the eye-piece, so that the individual reflections, combined with the retentivity of the eye, makes it possible to provide definite edges to the light pattern. This is particularly desirable when dealing with very low frequencies.

What I claim is:

1. In an instrument for measuring the amplitudes of sine waves recorded on a disc, the combination of a support for the disc for bodily moving the disc in a straight line, a lamp movable in a straight line at right angles to the line of bodily movement of the disc and in a plane parallel with and spaced from the plane of the disc, means constituting a line of sight disposed at right angles to the plane of the disc and passing through the line of its bodily travel for viewing the light pattern reflected from the disc, an electric circuit including two potentiometers connected in cascade, a mechanical operative connection between said support and one of said potentiometers for varying the output thereof proportionally to the bodily movement of the disc, and a mechanical operative connection between said lamp and the other of said potentiometers for varying the output of said other potentiometer proportionally to the movement of said lamp.

2. In an instrument for measuring the amplitudes of sine waves recorded on a disc, the combination of a support for the disc for bodily moving the disc in a straight line, a lamp movable in a straight line at right angles to the line of bodily movement of the disc and in a plane parallel with and spaced from the plane of the disc, means constituting a line of sight disposed at right angles to the plane of the disc and passing through the line of its bodily travel for viewing the light pattern reflected from the disc, an electric circuit including two potentiometers adapted to multiply the outputs of said potentiometers, means for varying the output of one of said potentiometers proportionally to the bodily movement of the disc, and means for varying the output of the other of said potentiometers proportionally to the movement of said lamp.

3. In an instrument for measuring the amplitudes of sine waves recorded on a disc, the combination of a support for the disc for bodily moving the disc in a straight line, a lamp movable in a straight line at right angles to the line of bodily movement of the disc and in a plane parallel with and spaced from the plane of the disc, means constituting a line of sight disposed at right angles to the plane of the disc and passing through the line of its bodily travel for viewing the light pattern reflected from the disc, an electric circuit including an output measuring instrument, and separate operative connections between said support and said instrument and between said lamp and said instrument for measuring the output produced as a function of the bodily movements respectively of said support and of said lamp.

ROBERT E. SANTO.

REFERENCES CITED

The following references are of record in the file of this patent:

UNITED STATES PATENTS

| Number | Name | Date |
| --- | --- | --- |
| 1,916,973 | Friebus | July 4, 1933 |
| 1,917,003 | Williams | July 4, 1933 |